United States Patent Office 3,192,011
Patented June 29, 1965

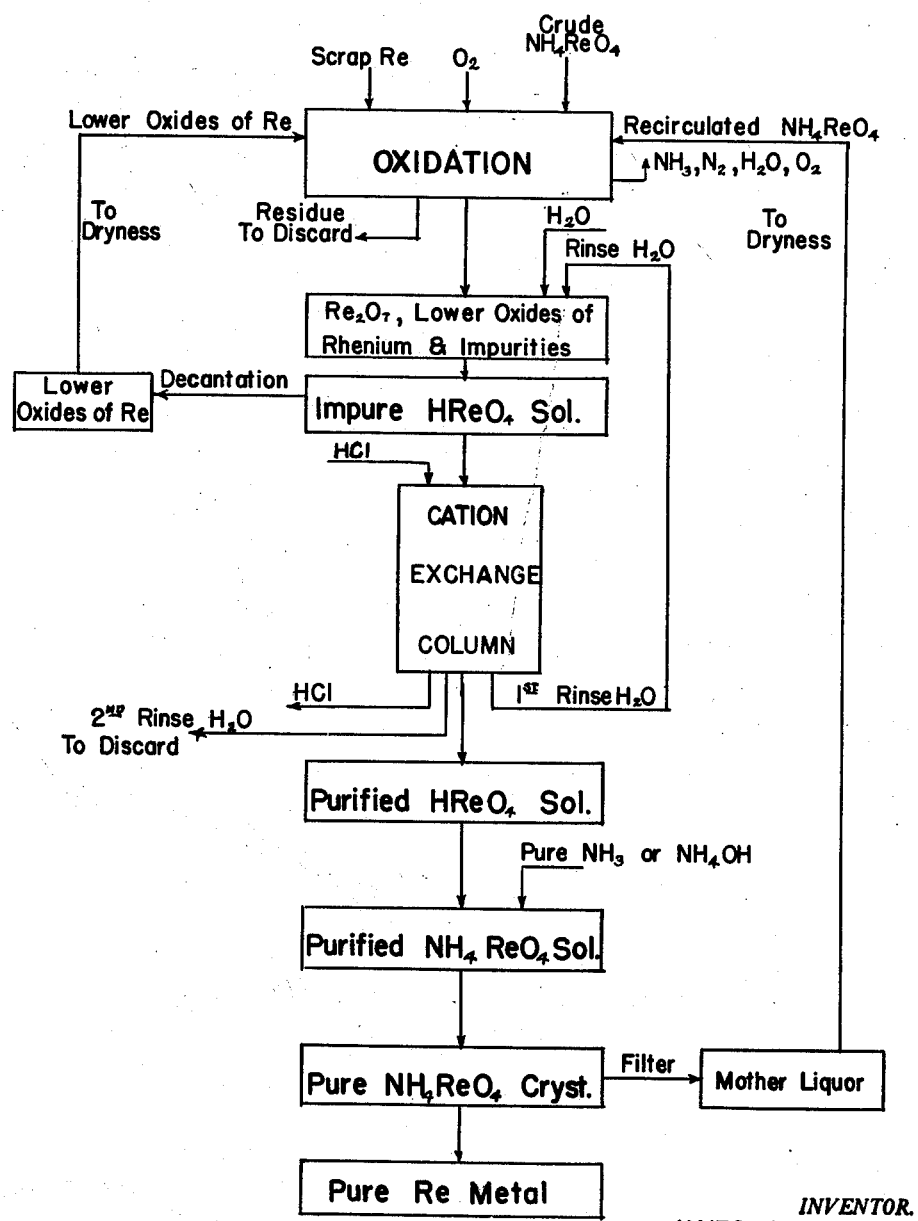

3,192,011
PROCESS FOR PRODUCING HIGH PURITY
RHENIUM COMPOUNDS
James Cooper, Jr., Oreland, Pa., and Joseph J. Aldrich,
Meriden, Conn., assignors to Chase Brass & Copper
Co. Incorporated, Waterbury, Conn., a corporation of
Connecticut
Filed Aug. 7, 1963, Ser. No. 303,714
9 Claims. (Cl. 23—22)

This application is a continuation-in-part of our copending application Serial No. 26,043, filed May 2, 1960 and now abandoned.

This invention relates to a process of recovering extremely high purity rhenium values from relatively impure rhenium-containing starting materials; and it is concerned more particularly with a process for obtaining rhenium compounds, or the metal itself, in which certain hitherto difficultly removable metallic impurities are either eliminated, within the limits of detection of presently available equipment, or are reduced to a low order not readily obtainable previously.

Various processes for recovering rhenium values in a purified state have been proposed heretofore. Those earlier processes, however, have not effected a reduction of the content of certain impurities, more especially alkali metal residues, to the extremely low order now found to be desirable to realize the maximum potential of rhenium and its compounds for various industrial and commercial applications. Thus, prior methods of purifying rhenium have enabled reduction of potassium impurities, one of the most troublesome, to be accomplished only to about 0.04% or 400 parts per million, based on the weight of the metal. In marked contrast to this, the novel process here described readily accomplishes reduction of the potassium content to as little as 1 part per million or less. Comparable results are achieved in respect to other metal impurities.

Rhenium, although a relatively rare and costly metal, has properties which render it useful in a number of commercially important applications. For example, inasmuch as the melting point of the metal is in the neighborhood of 3180° C., rhenium finds use in high temperature applications, both as a material of construction and as a component of thermocouple systems, since it can be used at temperatures several hundred degrees above the limits of other, more common, elements. In addition, the thermionic characteristics of the metal make it useful for certain electronic applications, such as ion source filaments operating in high vacua. As a filament material in incandescent lights, rhenium shows less tendency than does tungsten to undergo the so-called "water cycle" reaction, involving cyclic oxidation and reduction reactions catalyzed by residual moisture and resulting in a black or dark film being deposited on the inside of the glass envelope. Still further, electrical contact points made of rhenium for use in relays and the like have shown very desirable long-life characteristics.

Rhenium used for any of the above purposes should be of extremely high purity for a number of reasons. In particular, the amount of alkali salts, and especially the amount of potassium, retained by the rhenium must be extremely low, and preferably non-detectable by such highly sensitive test techniques as flame photometry. One important reason for the need of extremely high purity metallic rhenium arises from difficulties encountered in obtaining high density powder metal compacts when fabricating articles of rhenium by powder metallurgy techniques. Although rhenium can be melted in an inert atmosphere on a copper hearth using a tungsten electrode, the resultant metal is not well suited for fabrication, more especially because of its coarse, as-melted grain structure. The cast metal can be cold worked by rolling, but the coarse grain structure demands very careful processing to prevent rupture at the grain boundaries. Consequently it is far more usual to employ powder metallurgy techniques for the production of wrought rhenium metal. The purity of the rhenium metal is particularly significant here, as it can be shown that even small amounts of potassium, for example, have a very marked effect on the resulting product. This is borne out by the data given in the following table, from which it readily appears that the density of sintered compacts of rhenium is markedly lowered by the presence of traces of potassium:

TABLE 1

*The effect of potassium on the sintered density of rhenium*

| Potassium content (Percent of rhenium metal): | Sintered density (Percent theoretical) |
|---|---|
| Less than 0.006 | 90 |
| From 0.02 to 0.05 | 80–88 |
| From 0.06 to 0.10 | 70–80 |

In addition to hindering the consolidation of rhenium powder, the presence of small amounts of potassium as well as other alkali metals, or in fact any metal having a melting point well below that of rhenium, such as copper, nickel or iron, destroys the usefulness of rhenium for many high temperature, high vacuum or thermionic uses. It can be appreciated, for example, that a filament wire for an electronic device made of rhenium and operating at a temperature above the boiling point of a metal compound present as an impurity, will fail due to volatilization of such impurity. To obtain the performance which warrants the use of the expensive and rare metal, it is essential, therefore, that the rhenium be as free from contaminating elements as is possible.

The usual source of rhenium metal powder for use in fabrication by powder metallurgy techniques is a rhenium salt which is reduced to rhenium metal powder by a reducing gas. Conventionally, rhenium values contained in flue dusts and gases derived from the roasting of certain molybdenum sulfide metallurgical concentrates, are recovered by dissolving the sublimed and condensed oxides in water or other solvent for the rhenium, and then precipitating the rhenium as potassium perrhenate. This latter compound may be reduced with hydrogen to from metallic rhenium and potassium salts, the latter being removed in part by repeated washing of the powder with water, but the metal so recovered is of low purity. Alternatively, the metal has been obtained by converting the potassium perrhenate to ammonium perrhenate and reducing the latter with hydrogen. Because of the solubility of the salts involved, the separation of the potassium perrhenate from the ammonium perrhenate by fractional crystallization is extremely difficult to accomplish. Repeated fractional crystallizations are required to produce ammonium perrhenate of acceptably low potassium content. In such recrystallizations, large amounts of ammonium perrhenate are necessarily removed from the system with the potassium salts. As this perrhenate must be recovered in a useful form, purification by re-crystallization is a laborious and expensive operation. Consequently such methods are undesirable technically and unacceptable economically. Other chemical methods of separation of rhenium values recovered from molybdenite concentrates or flue dusts from molybdenite roasters include processes employing anion exchange techniques where the rhenium values are retained on a suitable anion exchange resin and subsequently released. Here again, however, it has not been found possible to reduce the content of impurities to the very low level so much desired.

The deleterious impurities, which include the alkali metals sodium and potassium, alkaline earth metals such as calcium, as well as traces of copper, nickel and iron, all commonly found in rhenium salts, may be derived either from the prime sources of rhenium, from the reagents used in recovery of the rhenium from its sources, or from the materials of construction used in the extraction operations. Alkali or alkaline impurities found in rhenium salts obtained from reworking metallurgical scrap may come from lubricants used in fabricating the metal, or may even come from the hands of the operators. The source of the impurities found in the rhenium salts is of considerably less importance than is the fact that the impurities are present and must be removed prior to final reduction of the rhenium salt if good quality rhenium powder is to be obtained.

We have found that rhenium metal values, obtained from whatever source and converted to impure perrhenic acid solution by any suitable method, can be processed to provide a perrhenic acid solution of extremely high purity, on the order of 1 part or less of potassium, for example, per million parts of rhenium, by employing a cation exchange resin treatment.

In accordance with our process, an impure solution of perrhenic acid may be obtained by burning either scrap rhenium or an impure rhenium salt in oxygen. The volatile oxides of rhenium, which are sublimed and condensed, are washed with water to extract the soluble content. The impure solution thus obtained is then brought into contact with a cation exchange resin which removes the impurities and produces a perrhenic acid solution of extremely high purity. Upon subsequent neutralization of the solution thus obtained with pure ammonia or ammonium hydroxide, and evaporation to effect crystallization, ammonium perrhenate of exceptional purity is deposited. These crystals are essentially free of any detectable alkali or alkaline metal salts other than ammonium, and contain only a few parts of all metals combined, other than rhenium, per million parts of rhenium.

A process embodying the preferred steps of recovery of the purified rhenium values is illustrated by way of example in the accompanying flow diagram.

With reference to the diagram, crude ammonium perrhenate (which may come in part from a subsequent step in the process), or metallurgical scrap, or both, is burned in an atmosphere of oxygen. The volatile products including rhenium heptoxide, very small amounts of other oxides of rhenium, ammonia, water vapor, nitrogen, excess oxygen and some metallic impurities, are driven off. Rhenium heptoxide and other rhenium oxides, plus some impurities, principally the alkali metals, are condensed in a suitable vessel and the soluble content of the sublimated products extracted with water. The higher oxide of rhenium, i.e. rhenium heptoxide, is extremely soluble, going rapidly into solution. As mentioned, there are usually present also very minor amounts of insoluble lower oxides of rhenium which settle out and are thus easily removed by decanting the supernatant solution. The lower oxides are recovered, dried and returned to the oxidation step for further treatment.

The decanted solution comprises perrhenic acid, together with concomitant impurities, more especially potassium salts. The impure acid solution thus obtained is then passed through an iron exchange column in which there is contained a cation exchange resin material. The cation impurities, and especially the alkali metal ions present in the impure perrhenic acid solution, are retained on the exchange material. This is somewhat surprising in view of the fact that the exchange material is normally stripped to effect regeneration when necessary by a strong acid, and perrhenic acid is itself a strong acid. Nevertheless the cation impurities are retained on the resin, and the resulting perrhenic acid solution is of very high purity.

After a given volume of impure perrhenic acid has been passed through the exchange column, "breakthrough," that is, appearance of cation impurities in the effluent, will occur and regeneration of the resin is necessary to restore it to the operative condition. Therefore, before the breakthrough point is reached, the passage of impure perrhenic acid through the exchange resin is discontinued and the resin is washed with a distilled water rinse to extract any remaining perrhenic acid. This rinse is subsequently combined with impure perrhenic acid starting solution, or is itself used in extracting the soluble rhenium values from the condensed sublimate.

As mentioned above, the ion exchange material is regenerated from time to time as necessary, using a strong acid such as hydrochloric, followed by a water rinse. This second water rinse is discarded and the ion exchange column is then ready for further treatment of impure perrhenic acid.

Conversion of the purified perrhenic acid solution to ammonium perrhenate is accomplished by adding pure ammonium hydroxide, or ammonia, and evaporating the solution to effect crystallization of the ammonium perrhenate. The mother liquor obtained in this step is further dried and returned to the start of the process to be recycled. Metallic rhenium itself is obtained by reduction of the purified ammonium perrhenate with hydrogen in known manner.

In practicing the invention, the concentration of the impure perrhenic acid solution used in the cation exchange step can vary from around 20 to 200 grams of contained rhenium per liter with equally effective results. In this range of rhenium concentration the pH values of the solutions always are less than 1.0 and at the concentrations given in the examples set out hereinafter the pH values are 0.23 for Example I and less than 0.10 for Examples II and III. The impure acid obtained from dissolving the sublimate obtained from the oxidation step is diluted to a suitable concentration within the above-indicated range, and is then passed through conventional ion exchange equipment to ensure intimate contact of the solution with a suitable cation exchange material. Preferably, quartz or very high silica equipment is used to reduce the pick-up of sodium, potassium or other alkali metal ions during the treatment. A cation exchange material found particularly effective is a synthetic resin known commercially by the designation "Amberlite IR-120," manufactured by Rohm & Haas as described in U.S. Patent No. 2,366,007. This is a nuclear sulfonic acid resin, more particularly a divinylbenzene polystyrene polymer. It has been found that the optimum rate of through-put for this material is about 0.025 gallon per minute of solution per cubic foot of resin. It has also been found advantageous to limit the volume of perrhenic acid treated to around 20 gallons per cubic foot of resin, in order to be certain that the cation impurities are completely adsorbed by the resin and that the breakthrough point of the material is not reached. When this volume of solution has passed through the resin bed, an equivalent volume of distilled water is employed to rinse the column. As previously mentioned, this first water rinse is saved and used to make up succeeding lots of impure perrhenic acid.

Following the rinse, the exchange material is regenerated, preferably with a 12% hydrochloric acid solution. This effects complete removal of the cation impurities from the resin bed. While acids other than hydrochloric can be used for this purpose, they should be of a non-oxidizing nature, since it is preferred to maintain the iron, one of the major impurities, in a reduced valence stage to avoid precipitation of oxidized iron compounds within the resin bed. After regeneration, the exchange material is rinsed with distilled water, this second rinse discarded, whereupon the exchange material is ready for further processing of impure perrhenic acid solutions.

The following examples illustrate the effectiveness of the process.

EXAMPLE I

Approximately one kilogram of crude ammonium perrhenate was converted, by burning it in an atmosphere of oxygen, to the heptoxide which was then dissolved in water. The impure perrhenic acid solution, obtained by decanting the resulting solution from the insoluble lower oxides, had a concentration of 73 grams of rhenium per liter, and contained 17 parts iron and 80 parts potassium per million parts of rhenium as impurities. Following treatment in accordance with the procedure described hereinabove, the potassium content of the solution was reduced to a non-detectable value (less than 1 p.p.m.) as determined by a highly sensitive flame photometric method, and the iron content was reduced to 2.5 p.p.m. of rhenium.

EXAMPLE II

In this case, 2.3 kilograms of crude ammonium perrhenate were converted to perrhenic acid as described in Example I, forming a solution containing 197 grams of rhenium per liter. The potassium content of this solution was 40 parts, and the iron content 98 parts, per million parts of rhenium. After ion-exchange treatment in accordance with the invention, the potassium was reduced to a non-detectable value (again, less than 1 p.p.m.) and the iron content was reduced to 1 p.p.m. of rhenium.

EXAMPLE III

One kilogram of rhenium metal scrap was oxidized by burning the same in an atmosphere of oxygen to the heptoxide. The oxide was then dissolved in water and decanted to give a perrhenic acid solution containing 120 grams of rhenium per liter. In this instance, the potassium content was 560 parts, and the iron content was 130 parts, per million parts of rhenium. When treated by our cation exchange process, the potassium was again reduced to a non-detectable level, while the iron was decreased to approximately 3.5 p.p.m. of rhenium.

EXAMPLE IV

In this case the impure perrhenic acid solution before treatment contained 8.8 parts of potassium and 80 parts of iron per million parts of rhenium. Following treatment, it was again impossible to detect any potassium, while the iron content was down to 3.5 p.p.m. of rhenium.

Cooper, magnesium and aluminum present in the impure perrhenic acid starting solution are reduced to 1 part or less per million parts of rhenium from values which range typically from an original of as much as 10 p.p.m. Similarly, calcium concentrations are reduced from 10 p.p.m. of rhenium to non-detectable amounts. In each case, the various analytical methods employed indicated that all cations, other than sodium and potassium, are either eliminated or reduced to a level of less than 5 p.p.m. of rhenium. As to potassium and sodium, the most sensitive flame photometric method of analysis indicates that the purified perrhenic acid solution contains neither of these in any detectable amount.

It is believed to be broadly novel to utilize a cation exchange process for treating impure perrhenic acid solutions, whereby the impurities are retained on the exchange bed while the perrhenic acid passes through and is purified. Accordingly, the foregoing specific examples embodying the process of the invention are illustrative only and are not intended to be limiting of the scope of the invention, as it will be appreciated that changes may be made within the scope of the following claims without departing from the essential concept of the inventive contribution.

What is claimed is:

1. The process of treating impure perrhenic acid solution to remove residual extraneous metal cation contaminants and especially alkali metal ion contaminants, which comprises contacting a solution consisting essentially of impure perrhenic acid containing from about 20 to 200 grams of rhenium per liter and having a solution pH of less than 1.0, with cationic exchange resin to effect adsorbtion thereon of said contaminants, and withdrawing purified perrhenic acid solution as the effluent from said exchange resin.

2. The process defined in claim 1, which further includes the steps of neutralizing the purified perrhenic acid solution with a high purity base selected from the group consisting of ammonia and ammonium hydroxide, and evaporating the resulting solution to crystallize purified ammonium perrhenate therefrom.

3. The process as defined in claim 1, wherein said exchange material is polystyrene divinylbenzene sulfonic acid synthetic resin.

4. The process as defined in claim 1, wherein the volume of impure perrhenic acid passed through said exchange material is limited to approximately 20 gallons per cubic foot of resin material.

5. The process as defined in claim 1, wherein the rate of flow of said impure perrhenic acid solution through said exchange material is approximately 0.025 gallon per minute per cubic foot of exchange material.

6. The process of recovering rhenium values free of alkali metal ion contaminants from crude starting material obtained commercially from roasting of industrial molybdenum sulfide metallurgical concentrates, which comprises the steps of burning the rhenium-containing starting material in the presence of oxygen to convert rhenium values thereof to the heptoxide, dissolving the oxidized rhenium values in water to provide a solution consisting essentially of from about 20 to 200 grams of rhenium per liter and having a solution pH of less than 1.0, contacting the solution thus obtained with a cationic exchange resin, and withdrawing purified perrhenic acid as the effluent from said exchange resin.

7. The process of recovering rhenium values free of alkali metal ion contaminants from impure rhenium-containing starting materials obtained commercially from roasting of industrial molybdenum metallurgical concentrates, which comprises heating the starting material in an excess of oxygen to convert contained rhenium values to the oxide forms thereof, and predominantly the heptoxide form, sublimating and condensing the oxides, dissolving the condensed sublimates in water to extract the soluble rhenium content and adjusting the concentration of the resulting solution to provide a solution consisting essentially of perrhenic acid containing from about 20 to 200 grams of rhenium per liter having a solution pH of less than 1.0, decanting the last said solution and passing the same over a cationic exchange material, whereby alkali metal ion contaminants are retained by said exchange material, and withdrawing purified perrhenic acid as the effluent from said exchange material.

8. The process of treating impure perrhenic acid solution to remove residual potassium ion contaminants commonly present in the impure solution, whereby said contaminants in the treated solution do not exceed about 1 part per million parts of rhenium, which comprises contacting an impure solution consisting essentially of perrhenic acid containing from about 20 to 200 grams of rhenium per liter and residual amounts of potassium ion as a contaminant with cationic exchange resin and withdrawing purified perrhenic acid solution as the effluent from said exchange resin.

9. The process as defined in claim 8, wherein said exchange resin is a polystyrene divinylbenzene sulfonic acid.

References Cited by the Examiner

UNITED STATES PATENTS 2,876,065  3/59  Zimmerley et al. _____ 23—22 X
2,945,745  7/60  Zimmerley et al. _____ 23—24

OTHER REFERENCES

Lazarer: "Zhurnal Prikladnoi Khimii," vol. 33, No. 2, pages 468, 469, 1960.

Rosenbaum et al.: "Journal of the Electrochemical Society," vol. 103, No. 9, September 1956, pages 518–521.

Ryabchikov et al.: "Doklady Akademii Nauk SSSR" (Reports of the Academy of Sciences of U.S.S.R.), vol. 92, No. 4, pages 777–779, 1953.

Ryabchikov et al.: "Akademiya Nauk SSSR, Trudy Komissii po Analiticheskoi Khimii," vol. 7(X), pages 64 to 76, 1956.

MAURICE A. BRINDISI, *Primary Examiner.*